United States Patent
Kamei et al.

(10) Patent No.: US 6,674,416 B2
(45) Date of Patent: *Jan. 6, 2004

(54) SMALL-SIZED SENSOR (75) Inventors: Takashi Kamei, Kyoto (JP); Kiyoshi Imai, Kyoto (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,741

(22) Filed: Mar. 16, 2000

(65) Prior Publication Data

US 2003/0095082 A1 May 22, 2003

(30) Foreign Application Priority Data

Jul. 17, 1998 (JP) .......................... 10-203782

(51) Int. Cl.⁷ ................................ G09G 3/14
(52) U.S. Cl. .................. 345/39; 345/33; 345/34; 345/35; 345/40; 345/51; 235/462.17; 235/462.25; 235/462.42; 250/206.1; 340/691.6; 705/23; 705/414
(58) Field of Search .............. 345/33, 39, 35, 345/51, 34, 40; 235/462.17, 462.25, 462.42; 250/206.1; 340/691.6; 705/23, 414

(56) References Cited

U.S. PATENT DOCUMENTS

| | | | | |
|---|---|---|---|---|
| 4,278,917 A | * | 7/1981 | Kobori ................... 315/169.1 |
| 4,570,226 A | * | 2/1986 | Aussedat .................... 701/123 |
| 5,317,678 A | * | 5/1994 | Okawara et al. ............. 345/426 |
| 5,430,283 A | * | 7/1995 | Tanaka .................... 235/462.2 |
| 5,486,914 A | * | 1/1996 | Denove et al. ............. 356/221 |
| 5,675,760 A | * | 10/1997 | Houwen et al. ............. 345/440 |
| 5,717,189 A | * | 2/1998 | Goetz et al. ............... 219/483 |
| 5,739,823 A | * | 4/1998 | Akaza et al. ............... 345/440 |
| 5,815,072 A | * | 9/1998 | Yamanaka et al. .......... 340/461 |
| 5,818,428 A | * | 10/1998 | Eisenbrandt et al. ........ 345/173 |
| 6,031,566 A | * | 2/2000 | Leo ............................ 348/82 |
| 6,166,710 A | * | 12/2000 | Havel .......................... 345/46 |

FOREIGN PATENT DOCUMENTS

| JP | 54-77098 | 6/1979 |
|---|---|---|
| JP | 57-139982 | 9/1982 |
| JP | 59-160168 | 9/1984 |
| JP | 61-124081 | 8/1986 |
| JP | 9-252242 | 9/1997 |

* cited by examiner

Primary Examiner—Richard Hjerpe
Assistant Examiner—Abbas Abdulselam
(74) Attorney, Agent, or Firm—Morrison & Foerster LLP

(57) ABSTRACT

A photoelectric sensor 11 has a level display unit (28). The level display unit (28) is constituted by arranging a plurality of 7-segment indicators (33). The 7-segment indicators (33) are partially constituted of red LED segments (33*b*) and partially constituted of red/green two-color LED segments (33*a*). For a digital display, all of the segments are illuminated in red to display numerals. For a graph display, the red/green two-color LED segments are illuminated in green to present a bar graph.

7 Claims, 6 Drawing Sheets

SMALL-SIZED SENSOR

TECHNICAL FIELD

The present invention relates to sensor devices, and particularly to a small sensor device capable of presenting a digital display as well as a graph display.

BACKGROUND ART

A sensor device such as photoelectric sensor, proximity sensor and the like detects an outward physical state and compares a feature amount representing the physical state with a set threshold. Based on the result of this comparison, the sensor device outputs an ON signal or OFF signal. Generally, the sensor device has thus an output indicator lamp for displaying the output status (on or off) and turns on or off the indicator lamp according to the output status.

Figure 1:
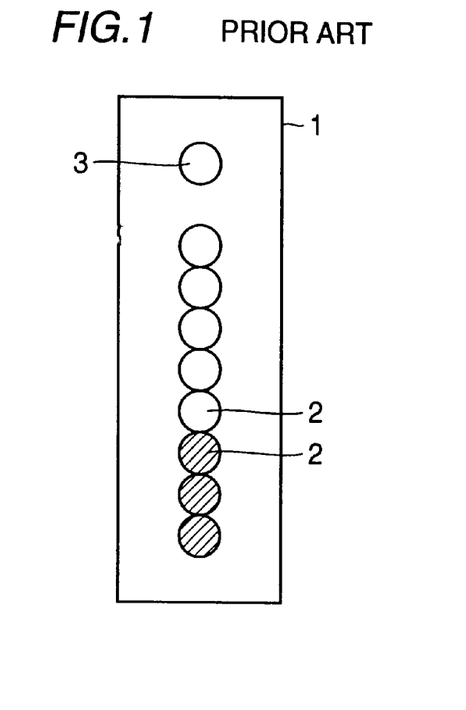
FIG. 1 illustrates a manner of displaying the level of received light by a conventional photoelectric sensor.
Figure 2:
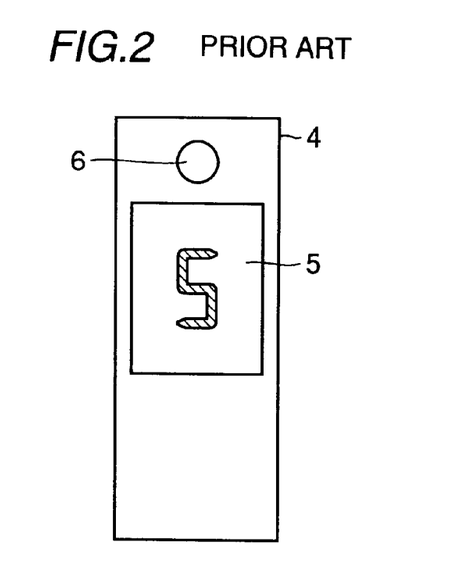
FIG. 2 illustrates a manner of displaying the level of received light by another conventional photoelectric sensor.

A sensor device providing an ON or OFF indication of an output status and further capable of providing recognition of the level of a feature amount has a bar graph indicator formed of a plurality of display segments to indicate the level of the feature amount by the bar graph indicator. For example, a display unit 1 of a sensor device shown in FIG. 1 uses a plurality of display segments 2 to present a bar graph display of a feature amount and display an output status by an output indicator lamp 3. A display unit 4 of a sensor device shown in FIG. 2 presents a digital display of a feature amount level by a numerical indicator 5 and displays an output status by an output indicator lamp 6.

The bar graph display system provides intuitive perception of the display contents and thus can be easily recognized while the system has a limited number of indication stages so that the display resolution is poor and the display range is small. On the other hand, the digital display system has a high display resolution and a large display range while intuitive recognition of numerical contents thereof is disadvantageously difficult.

As discussed above, a sensor device according to the bar graph display system and a sensor device according to the digital display system both have advantages and disadvantages that are contrary to each other. A required effect varies depending on an employed application so that one of the two types of sensors should be selected for use in order to achieve the optimum effect.

A display device constructed to achieve both of the digital display and bar graph display using one display unit is disclosed in Japanese Patent Laying-Open No. 59-160168, for example. According to this document, the display device is configured to present both of the digital and analog displays with one display unit. However, the display device disclosed in the document is of large type and thus it has not been known how to apply such a display device to a small sensor device.

The present invention is made to overcome the technical issues described above and one object of the invention is to provide a small sensor device with superior visible recognizability capable of presenting a graph display as well as a digital display according to selection by a user of the sensor device.

DISCLOSURE OF THE INVENTION

A sensor device according to the present invention includes a first face, a display unit mounted on the first face, and a selector for selecting a display of the display unit. The display unit can selectively display a plurality of numerals and a graph. When a numerical display is to be presented, the plurality of numerals are arranged in a first direction and when a graph display is to be presented, the axial direction of the graph is arranged in the first direction. The selector is located on the first face such that the selector does not overlap the display unit. On an arbitrary line on the first face passing through the display unit orthogonally to the first direction, only the display unit is substantially placed.

Typically the first face is substantially rectangular. In this case, the direction of the longer side of the rectangle may be arranged in the first direction. A plurality of numerals are then arranged in the direction of the longer side of the first face when the display unit presents the numerical display. The direction orthogonal to the first direction, or the direction of the shorter side of the first face corresponds to the direction of the height of the numerals. In the direction of the shorter side relative to the display unit, only the display unit itself is substantially placed. Therefore, a large display can be implemented using almost all of the maximum length of the shorter side. The height of numerals to be displayed is preferably at least half of the length of the shorter side.

According to the present invention as described above, when the sensor device is shaped as a small and thin type (the dimension of the shorter sides of the face having the display unit thereon is small), the sensor device can present a large display so that a graph display and a digital display are both possible depending on selection by the user and accordingly a small sensor device with a superior visible recognizability can be provided.

For nearly sheet-like sensor devices of thin type designed for use by closely contacting them to each other, one of the faces of each device corresponding to the end face of the sheet is unavoidably used as a display surface. In such a case, the display unit of the present invention could provide a display as large as possible as the display which presents a selected one of the numerical display and graph display.

The display unit herein can be constituted of a plurality of display segments. The display unit includes not only the normal 7-segment display unit but a dot matrix display unit. Each display segment can be implemented in a plurality of display states. A plurality of display states include those implemented by turning on/off an LED, illuminating an LED in different colors, blocking/transmitting light through a liquid crystal display, and the like.

More preferably, the sensor device consists of a plurality of faces crossing each other, one of the faces having thereon a display unit, the face on which the display unit is placed has a first dimension in a second direction orthogonal to the first direction (direction of arrangement of displayed numerals and axial direction of the graph), and the first dimension being the minimum among those of a plurality of faces constituting the sensor device. The dimension of the face herein refers to the dimension representing the entire shape of the face, for example, the length of the side of the rectangle and the dimension does not include the dimension of structural details of the face.

The dimension of the face on which the display unit of the sensor device is provided, for example the dimension in the direction of the shorter side is the minimum among the dimensions of faces constituting the sensor device. Since the display unit is mounted on the face with the minimum dimension, a plurality of combined sensor devices can entirely be made compact even if the sensor devices are placed on each other with respective display units aligned.

Still preferably, a plurality of numerals and a graph are displayed on the display unit in different display colors respectively.

As the numerical digital display and the graph display can be presented in different display colors, each display can be provided clearly even if the digital display and the graph display share the digital display portion and the graph display portion.

"Display color" refers to the main color employed for display. In the case of the LED, the color of emitted light corresponds to the display color and there is presented no display color when the LED is in the turned off state. In the case of the liquid crystal display, a color different from a base color surrounding displayed numerals or graph corresponds to the display color. If the base color is not black and numerals or graph are displayed in black, black is the display color.

In order to present a numerical display and a graph display in different display colors respectively, display segments presenting a display color which can be changed may be provided or display segments of different display colors may be mixed.

Still preferably, the display unit includes a display segment used for presenting a numerical display and a display segment used for presenting a graph display. The display segment employed for presenting the graph display is selected from the display segment employed for presenting the numerical display and has a display color which can be changed. The display color of the display segment is selected so as to present the numerical display and the graph display respectively in different colors.

The numerical display and the graph display share the display segments so that the cost of the sensor device can be reduced and the contents of a display currently presented can be discerned clearly owing to the display colors.

Still preferably, feature amount acquiring means for acquiring a feature amount indicating a physical state of an object to be sensed, threshold setting means for setting a threshold for determining the feature amount, and display mode selecting means are further provided. A mode of displaying the feature amount by numerals and/or a mode of displaying the threshold by numerals and a mode of displaying the feature amount by a graph are provided as a display mode. The display mode selecting means may be a selector placed on the face having thereon the display unit, a switch placed on another face, or means for selecting a display mode according to a signal input from the outside of the sensor device.

Still preferably, the display unit includes a plurality of display segments having a display color which can be changed. When the feature amount is displayed by a graph, a part of the display segments is presented in a display color different from the display color for the graph so as to indicate the position of the threshold by the position of the part of the display segments.

Still preferably, a displayed range of the numerical value of the feature amount or the threshold is different from a range of the value of the feature amount displayed by the graph.

The displayed range of the feature amount can be changed depending on the numerical display and the graph display, so that the characteristics of respective displays can be exhibited effectively.

According to another aspect of the invention, a sensor device includes feature amount acquiring means for acquiring a feature amount indicating a physical state of an object to be sensed, threshold setting means for setting a threshold to determine the feature amount, and a plurality of display segments, and further includes a display unit presenting a numerical display and display mode selecting means for selecting any of a numerical display mode and a graph display mode. At least a part of the display segments used for presenting the numerical display has a display color which can be changed. In the numerical display mode, the feature amount or the threshold is indicated by numerals in one display color. In the graph display mode, the feature amount is displayed by a graph using display segments selected from the display segments for the numerical display. The position of the threshold in the graph is indicated by displaying a part of the display segments selected from the display segments for the numerical display in a display color different from a display color of the graph such that the position of the part of the display segments corresponds to the position of the threshold.

Using the same display segments, a desired one of the numerical display and the graph display can be presented, and the sensed feature amount and the threshold are represented in different colors respectively in the graph display. Accordingly, a compact sensor device capable of clearly displaying sensed data in a desired display mode can be provided.

The graph display indicating the feature amount may be presented in the same display color as that of numerals, or the display color of the threshold in the graph may be the same as the display color of numerals. If the display color of the graph indicating the feature amount is the same as the display color of numerals, the display color of the display segments presenting a display of the threshold in the graph can be changed. If the display color of the threshold in the graph is the same as the display color of numerals, the display color of the display segments representing the feature amount by the graph can be changed.

According to a further aspect of the invention, a display unit includes a plurality of display segments for displaying a plurality of numerals, and a graph display is presented by using display segments selected from the display segments for presenting a numerical display. The display segments used for the graph display have a display color which can be changed. The display color of the display segments can be selected so that the numerical display and the graph display are presented in different colors respectively.

A desired display mode is selectable and which display is now presented can easily be recognized. Accordingly, the display unit of the present invention can be employed not only in the sensor device but in a wide range of applications in which the numerical display and the graph display are interchanged in a small display space and with a superior visible recognizability.

BEST MODES FOR CARRYING OUT THE INVENTION

Embodiments of the present invention are hereinafter described in conjunction with the drawings.

(1) First Embodiment

Figure 3:
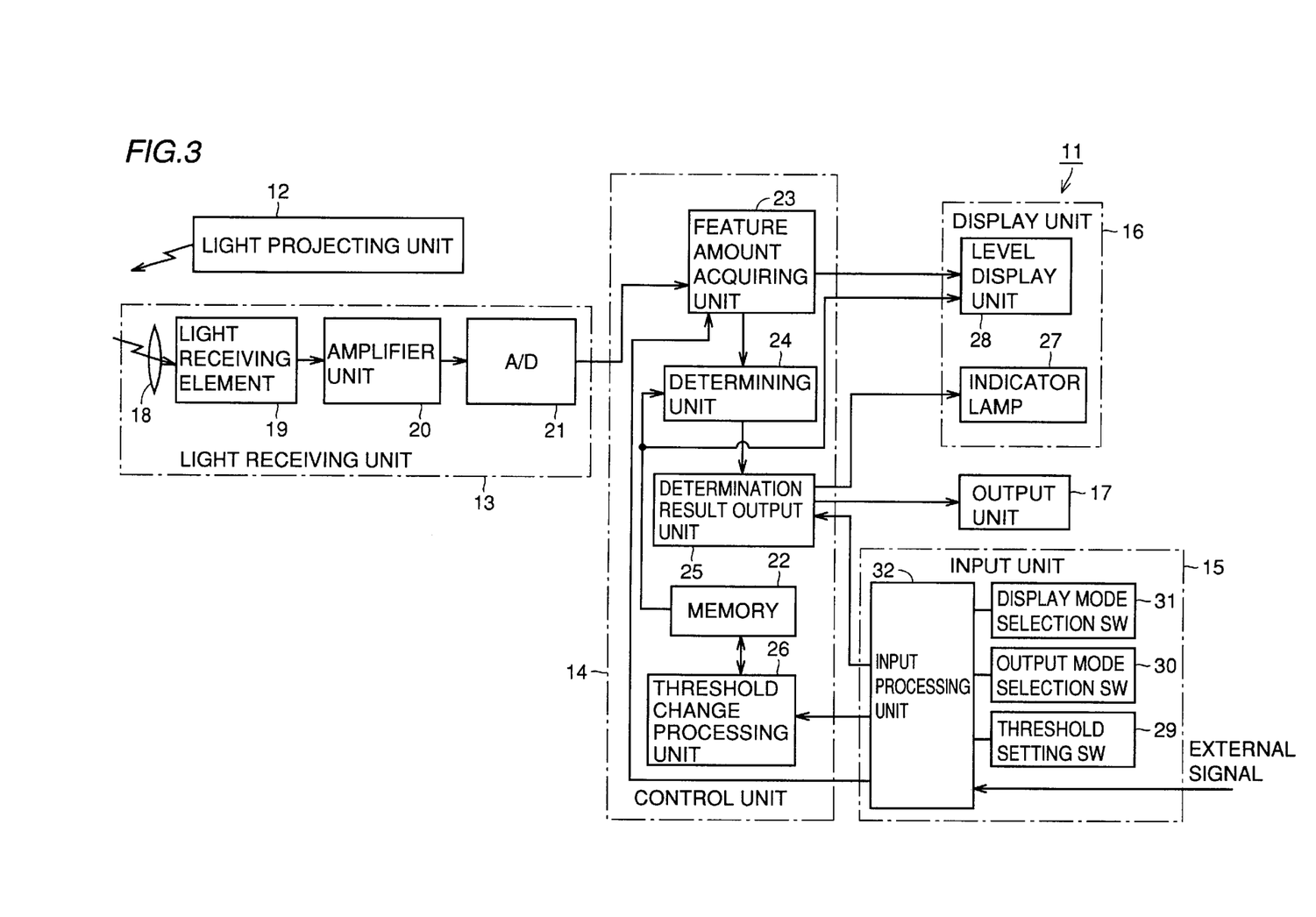
FIG. 3 is a block diagram illustrating an electrical structure of a reflection type photoelectric sensor in an embodiment of the present invention.

A first embodiment of the present invention is now described in conjunction with the drawings. Referring to FIG. 3, a reflection type photoelectric sensor 11 to which one embodiment of the invention is applied is constituted of a light projecting unit 12, a light receiving unit 13, a control unit 14, an input unit 15, a display unit 16 and an output unit 17.

Light projecting unit 12 includes a light-emitting element such as light-emitting diode (LED), semiconductor laser (LD) and the like, a drive circuit for the element, a light projecting lens system and the like and periodically (successively) emits light in pulse manner toward an object sensing region according to a signal from control unit 14.

Light receiving unit 13 is formed of a light receiving lens system 18, a light receiving element 19 such as photo transistor, photodiode and the like, an amplifier unit 20, and an A/D converter circuit (analog/digital converter circuit) 21. If an object is present in the sensing region, the light emitted from light projecting unit 12 is reflected from the object to be received by light receiving element 19 through light receiving lens system 18. Light receiving element 19 outputs a received light signal (analog signal) according to the amount of received light, amplifier unit 20 amplifies the received light signal output from light receiving element 19, and A/D converter circuit 21 converts the received light signal to a digital signal.

Control unit 14 is implemented by a microcomputer including a memory 22. There are four blocks representing functions implemented by the microcomputer, i.e. a feature amount acquiring unit 23, a determining unit 24, a determination result output unit 25 and a threshold change processing unit 26 respectively.

Memory 22 stores a threshold level Vth for ON and OFF determination by the sensor, resolution for adjusting threshold level Vth, and other data.

Feature amount acquiring unit 23 acquires a specific physical amount of an external state (feature amount) sensed by the sensor to allow the feature amount to be displayed on a level display unit 28 described below, the feature amount varying depending on the type of the sensor. In the case of reflection type photoelectric sensor 11, the feature amount corresponds to a level of the received light Vs reflected from the object, which is generated based on the received light signal of light receiving unit 13.

Determining unit 24 makes comparison between received light level Vs supplied from feature amount acquiring unit 23 and threshold level Vth stored in memory 22 so as to determine the acquired feature amount. Based on relative magnitudes of received light level Vs and threshold level Vth, determination unit 24 outputs an ON signal or OFF signal from determination result output unit 25 to display unit 16 and output unit 17.

Figure 4:
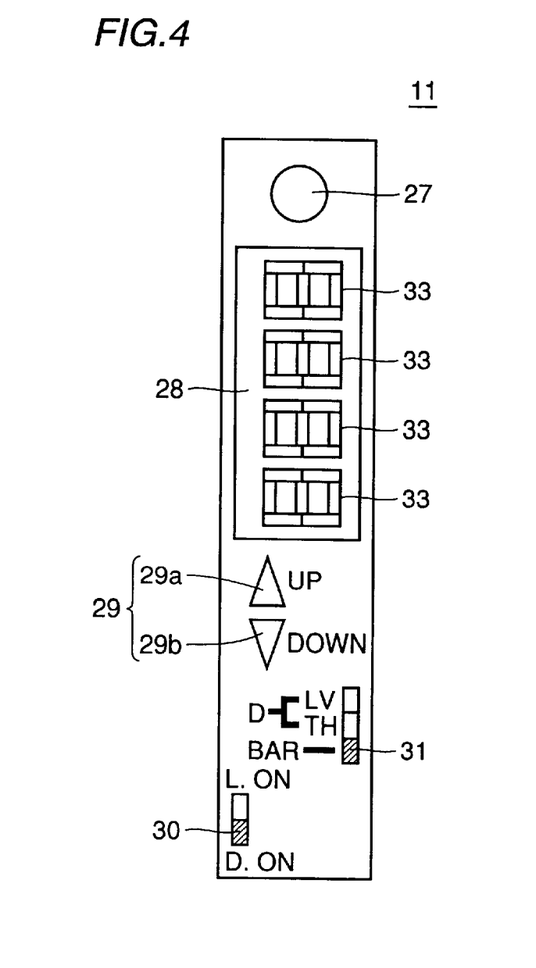
FIG. 4 is an external front view of the photoelectric sensor according to one embodiment of the invention.

Display unit 16 includes an output indicator lamp 27 for displaying the ON/OFF output, and level display unit 28 for displaying received light level Vs and threshold level Vth. As shown in FIG. 4, output indicator lamp 27 is constituted of one LED or lamp to be turned on or off according to the ON or OFF signal from determination result output unit 25. Control unit 14 selectively supplies received light level Vs obtained from feature amount acquiring unit 23 and threshold level Vth stored in memory 22 to level display unit 28 so as to allow received light level Vs or threshold level Vth to be displayed according to a display mode.

Figure 5:
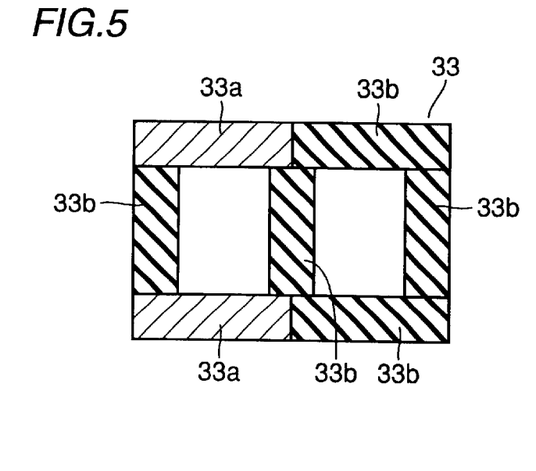
FIG. 5 illustrates a 7-segment indicator used for in a level display unit.

Level display unit 28 is configured by arranging four 7-segment indicators 33 in a line as shown in FIG. 4. One 7-segment indicator 33 is configured by arranging five red LED segments 33b and two red/green two-color LED segments 33a in "8" shape as shown in FIG. 5. Red LED segments 33b (segments represented by bold slant lines in FIG. 5) switch between two states by being lit in red and turned off, while red/green two-color LED segments 33a (segments represented by fine slant lines in FIG. 5) switch between three states by being lit in red and in green, and turned off. Accordingly, numerals 0 to 9 can be displayed as accomplished by a usual 7-segment indicator by selectively illuminating red LED segments 33b and red/green two-color segments 33a in red. Further, a green bar graph display can be presented in the direction of alignment of the segments by selectively illuminating red/green two-color LED segments 33a in green. At the same time, threshold level Vth can be indicated by lighting one red LED segment or two adjacent red LED segments 33b among those arranged in the longitudinal extension of red/green two-color LED segments 33a (red LED segments adjacent to LED segment 33a on the right in FIG. 5). When two LED segments 33b adjacent to each other are turned on, this means the threshold is intermediate between the illuminated two segments.

Output unit 17 converts the ON/OFF signal supplied from determination result output unit 25 to a signal appropriate for supplying it to an external unit for the purpose of control and other objectives.

Input unit 15 is formed of a threshold setting switch 29 for input of threshold level Vth, a display mode selection switch 31 for selecting a display mode of display unit 16, and an output mode selection switch 30, and details of setting by each switch are transmitted to threshold processing unit 26 through an input processing unit 32. Specifically, display mode selection switch 31 selects any of a mode of presenting a bar graph display of received light level Vs and threshold level Vth, a mode of presenting a digital display of threshold level Vth by numerals, and a mode of presenting a digital display of received light level Vs by numerals. When display mode selection switch 31 is set in the digital display mode of threshold level Vth, input of threshold setting switch 29 is possible. When threshold level Vth is input by operating threshold setting switch 29, threshold change processing unit 26 overwrites threshold level Vth in memory 22 to change threshold level Vth. At this time, level display unit 28 presents a digital display of threshold level Vth being set.

Output mode selection switch 30 is used for selecting one of a mode of activating sensor output (turning on output indicator lamp 27) when received light level Vs is high (reflected light is incident on the light receiving unit) and a mode of activating sensor output (turning on output indicator lamp 27) when received light level Vs is low (no incidence of reflected light).

FIG. 4 illustrates one example of the structure of input unit 15. Threshold setting switch 29 is formed of an up (UP) switch 29a and a down (DOWN) switch 29b of touch switch type. Threshold level Vth increases upon pressing of up switch 29a and threshold level Vth decreases upon pressing of down switch 29b. Display mode selection switch 31 is constituted of a slide switch. A bar graph display of received light level Vs and threshold level Vth is presented on level display unit 28 when the switch is set at the BAR position, and a digital display of received light level Vs (feature amount) is presented by numerals on level display unit 28 when the switch is set at the D-LV position. When display mode switch 31 is set at the D-TH position, a digital display of threshold level Vth is presented on level display unit 28, and concurrently input of threshold level Vth by threshold setting switch 29 becomes possible.

Output mode selection switch 30 is also constituted of a slide switch. If the switch is set at the L. ON (light on) position, the selected mode is the mode of supplying ON output when received light level Vs is higher than threshold level Vth, and if the switch is set at the D. ON (dark on) position, the selected mode is the mode of supplying ON output when received light level Vs is lower than threshold level Vth.

It is noted that signals for setting threshold level Vth and for selecting a display mode of display unit 16 may be input to input processing unit 32 as external signals.

Figure 6A:
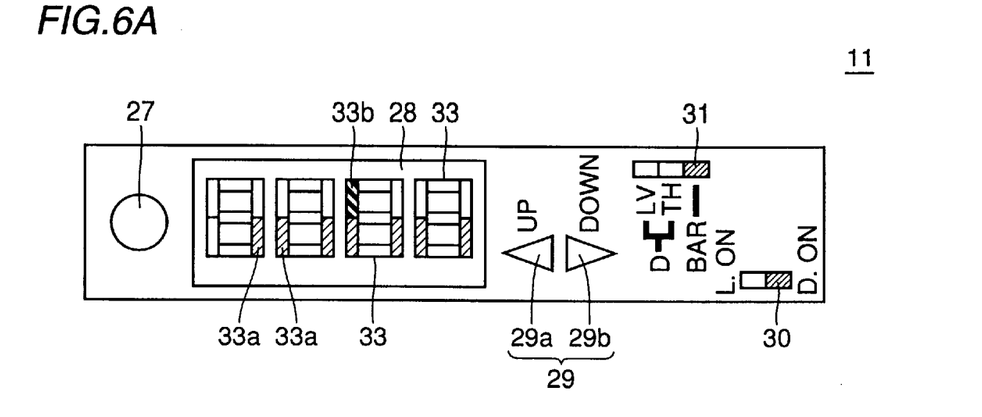
FIGS. 6A, 6B and 6C illustrate variations of a display state of the photoelectric sensor according to one embodiment of the invention.
Figure 6B:
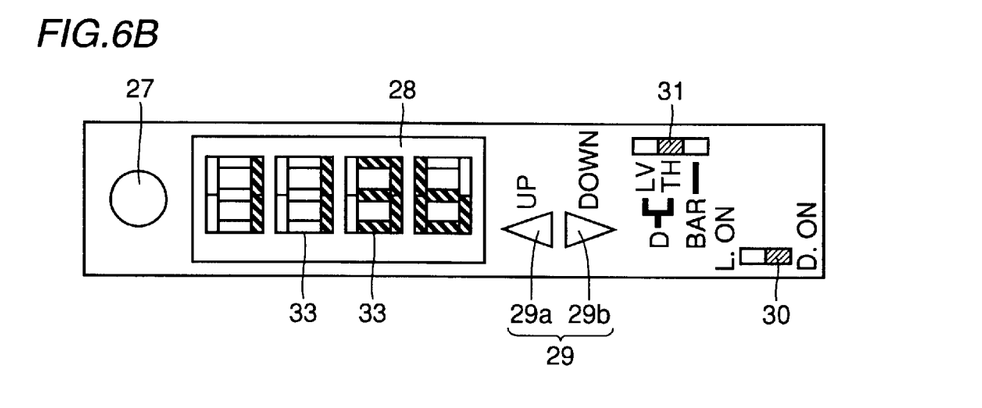
Figure 6C:
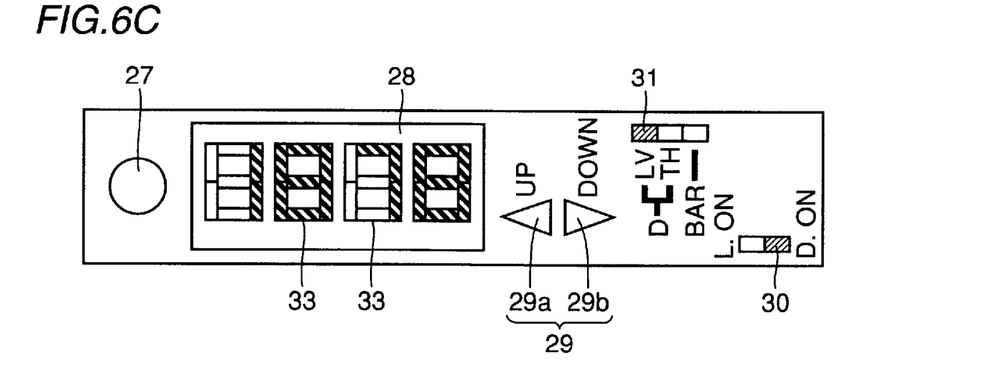

The states in use of photoelectric sensor 11 are specifically described next in conjunction with FIGS. 6A, 6B and 6C. FIGS. 6A to 6C all represent the states implemented by setting output mode selection switch 30 at the D. ON position. FIG. 6A represents a state implemented by setting display mode selection switch 31 at the BAR position in which a bar graph display of received light level Vs is presented by lighting red/green two-color LED segments 33a in green (segments are turned on in order from the rightmost one, the segments illuminated in green are indicated by thin slant lines in FIG. 6A), and the number of illuminated red/green two-color LED segments 33a changes from one minute to the next according to received light level Vs. On the other hand, threshold level Vth being set is represented by lighting red LED segment 33b (illuminated red segment is indicated by bold slant lines), and the scale of threshold level Vth corresponds to the scale of received light level Vs. By setting the bar graph display mode, the relation between received light level Vs and threshold level Vth can be displayed such that it is recognized intuitively.

FIG. 6C illustrates a state implemented by setting display mode switch 31 at the D-LV position, in which a digital display of a value of received light level Vs being measured is presented by numerals on level display unit 28. In this case, red/green two-color LED segments 33a are also illuminated in red (the segments illuminated in red are indicated by bold slant lines). In this mode, a digital display of received light level Vs is possible so that received light level Vs can be represented in a wide range with high resolution.

FIG. 6B illustrates a state implemented by setting display mode switch 31 at the D-TH position. In this mode, threshold level Vth can be set or changed by operating up switch 29a or down switch 29b of threshold setting switch 29. On the other hand, a digital display of a value of threshold level Vth being set is presented by numerals on level display unit 28. In this way, threshold level Vth can be set finely while being watched on the display.

After threshold level Vth is thus set, if display mode selection switch 31 is returned to the D-LV or BAR position, received light level Vs is indicated by numerals or a bar graph according to the position. The display range of threshold level Vth by the bar graph display is set smaller relative to the display range of threshold level Vth by the digital display. If the bar graph display mode (BAR) is selected, threshold level Vth being set is indicated substantially at the center of the display range of the bar graph. The display range of received light level Vs herein corresponds to a predetermined range with threshold level Vth at the center (e.g. a range centering at threshold level Vth extending several tens percents of the threshold level higher and lower than the threshold level, or a range which can be displayed with display resolution stored in the memory in advance).

In both of the cases of FIGS. 6A and 6C, output indicator lamp 27 is turned on when received light level Vs is lower than threshold level Vth.

As discussed above, photoelectric sensor 11 of this embodiment has one level display unit 28 formed of one set of 7-segment indicators 33 mounted on one rectangular face constituting photoelectric sensor 11, and the display unit can be used to change display of received light level Vs (feature amount) from the digital display to the bar graph display and vice versa. Further, in the case of the bar graph display, threshold level Vth can be indicated simultaneously. Accordingly, large numerals and bar graph can be presented in a limited space of the surface of the sensor device, so that visible recognizability of the display is excellent. In addition, the display mode can be selected depending on the requirement of the user and the cost can be reduced. Further, the portion representing the bar graph display of received light level Vs and the portion representing threshold level Vth are illuminated respectively in different colors and the portion presenting the bar graph display of the received light level Vs and the portion presenting the digital display thereof are respectively illuminated in different colors, so that the display can clearly be presented.

In this embodiment, the bar graph display of received light level Vs as shown in FIG. 6A may automatically be switched to the digital display of received light level Vs as shown in FIG. 6C and vice versa. Specifically, when the bar graph display of received light level Vs is presented as shown in FIG. 6A, if received light level Vs changes to surpass the range of the bar graph, the display is automatically switched to the digital display. On the contrary, when the digital display of received light level Vs is presented so as to allow the received light level to be displayed in a wide range, if the range of change in received light level Vs is within the bar graph range, the display can be changed to the bar graph display. Further, when received light level Vs is indicated by the bar graph as shown in FIG. 6A, if the change of received light level Vs is minute causing no change in the bar graph, the display may be switched to the digital one automatically. On the contrary, when the digital display is presented to allow a slight change in received light level Vs to be indicated, if change in received light level Vs increases to such an extent to cause change in the bar graph, the display may be switched to the bar graph display.

(2) Second Embodiment

Figure 7A:
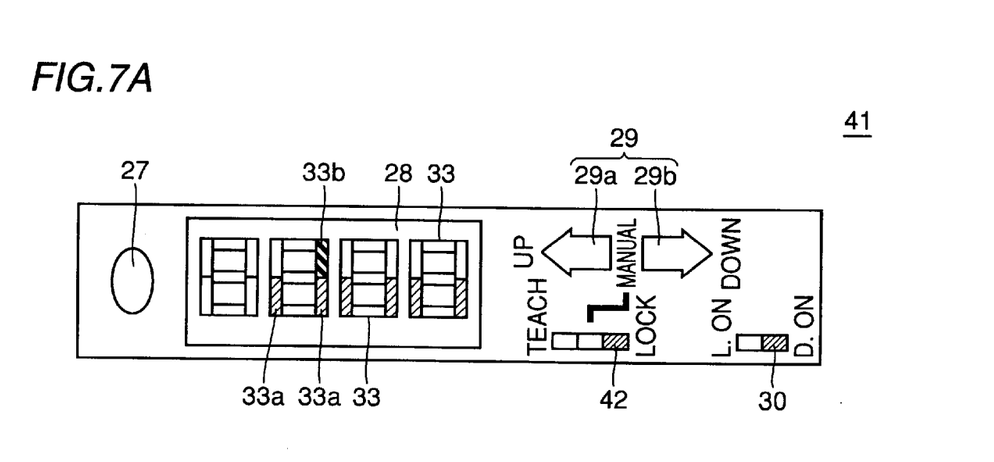
FIGS. 7A and 7B illustrate variations of a display state of a photoelectric sensor according to another embodiment of the invention.

A second embodiment of the invention is described below in conjunction with FIGS. 7A and 7B. In the second embodiment, display mode selection switch 31 in the first embodiment is replaced with an operation mode selection switch 42. Other components, particularly display unit 16, are identical to those in the first embodiment. By operation mode selection switch 42, the mode can be switched between a teach mode (TEACH position), a manual mode (MANUAL position) and a lock mode (LOCK position). Here, an initial threshold level Vth is set in the teach mode, threshold level Vth which has already been set is adjusted in the manual mode, and a normal sensing operation is carried out in the lock mode.

With regard to this sensor device, an object is placed as a reference ahead of light projecting and receiving units 12 and 13 and the operation mode selection switch is set at the TEACH position, then threshold level Vth is automatically derived and that threshold level Vth is stored in memory 22.

Figure 7B:
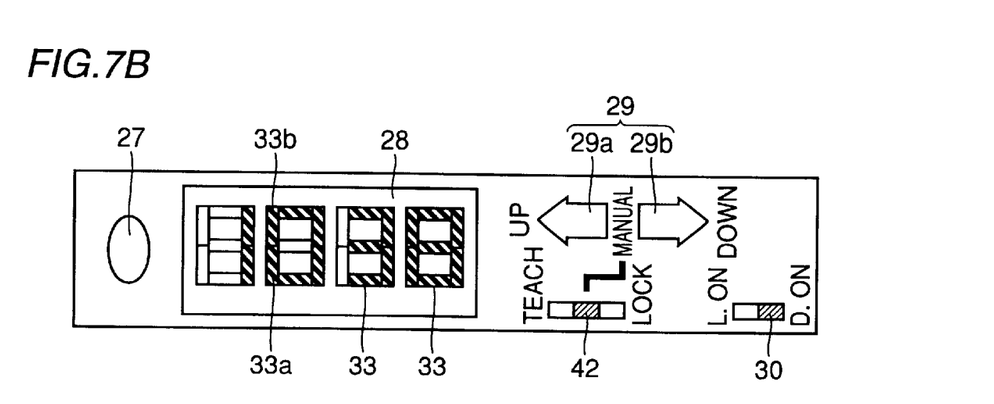

As shown in FIG. 7B, the operation mode selection switch is then slid to the MANUAL position so that threshold level Vth is displayed digitally on a level display unit 28. In this state, a threshold setting switch 29 can be operated to accomplish fine adjustment of the automatically set threshold level Vth in a wide range while the value on level display unit 28 is confirmed.

After threshold level Vth is accordingly set, the operation mode selection switch is set at the LOCK position. With the operation mode selection switch located at the LOCK position, threshold level Vth is set substantially at the central portion of the bar graph display. Received light level Vs is then displayed such that threshold level Vth is at the center with display resolution stored in a memory. In this lock mode, level display unit 28 presents a bar graph display and received light level Vs being measured and threshold level Vth being set are represented by the bar graph display.

In this embodiment, although a digital display is presented in the stage of setting threshold level Vth to enable threshold level Vth to be set finely. However, a bar graph display is provided after that setting so that intuitive recognition is possible and accordingly the device is easily used.

(3) Other Embodiments

Figure 8:
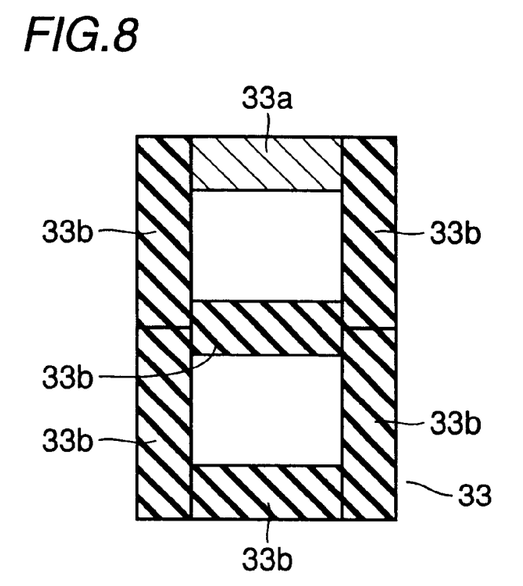
FIG. 8 illustrates another 7-segment indicator.
Figure 9:
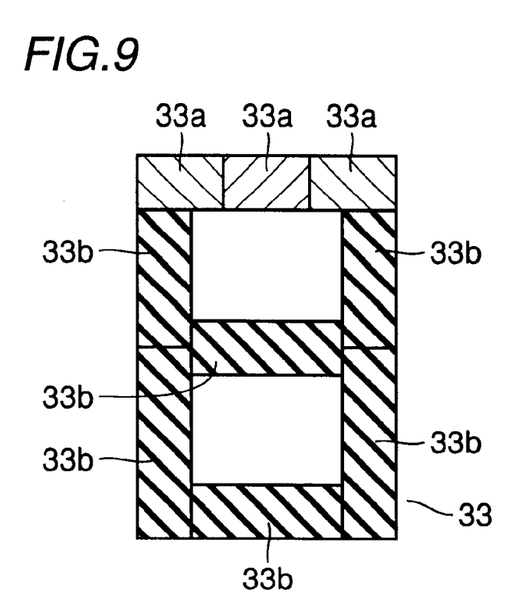
FIG. 9 illustrates still another 7-segment indicator.

There would be various modes of presenting a bar graph display using 7-segment indicators 33. Concerning 7-segment indicators 33 shown in FIGS. 6A to 6C, the longitudinal segments are formed of red/green two-color LEDs 33a and the longitudinal segments are arranged laterally to provide the bar graph display. The bar graph display may be presented by forming the lateral segment (indicated by thin slant lines) of a red/green two-color LED 33a and using horizontally arranged lateral segments as shown in FIG. 8. In this case, the threshold may be displayed by using lateral or longitudinal red LED segment 33b (indicated by bold slant lines).

In order to enhance the display resolution of the received light level, the red/green two-color LED segment may be divided into several sections.

In the embodiments described above, when the numerical digital display and the graph display can be switched, the digital display presents a feature amount in a full range (whole range) while the bar graph display presents the feature amount in a narrower range (local range), however, the digital and graph displays may present the feature amount in the same range.

The embodiments herein disclosed are by way of illustration and example only in all respects and are not to be taken by way of limitation. It is intended that the scope of the present invention is presented by the terms of the appended claims and not by the description above, and all modifications equivalent to and within the scope of the claims are included.

Industrial Applicability

As heretofore discussed, the sensor device according to the present invention is particularly suitable for being used as a small sensor since it has the display unit on which a digital display and a bar graph display can be presented with a superior visible recognizability.

What is claimed is:

1. A sensor device comprising:
    feature amount acquiring means for acquiring a feature amount which represents a physical state of an object to be sensed;
    threshold setting means for setting a threshold so as to determine the feature amount;
    a display unit including a plurality of display segments arranged in an 8-shape to present a numerical display; and
    display mode selecting means for selecting one of a numerical display mode and a graph display mode, wherein
    at least a part of the display segments used for presenting the numerical display has a display color which can be changed,
    the feature amount or the threshold is presented by the numerical display in one display color in the numerical display mode, and
    in the graph display mode, the feature amount is displayed by a graph using display segments selected from the display segments used for presenting the numerical display, and a part of the display segments selected from the display segments used for presenting the numerical display presents a display color different from a display color of the graph in order to indicate position of the threshold in the graph by position of the part of the display segments.

2. The sensor device according to claim 1, wherein a range of value of said feature amount or said threshold displayed by the numerals is different from a range of value of said feature amount displayed by the graph.

3. The sensor device according to claim 1, wherein display of said plurality of numerals and display of said graph are presented on said display unit in different colors respectively.

4. A sensor device comprising:
    feature amount acquiring means for acquiring a feature amount which represents a physical state of an object to be sensed;
    threshold setting means for setting a threshold so as to determine the feature amount;
    a display unit displaying a number with a plurality of digits using a plurality of display segments, wherein seven display segments having four longitudinal display segments and three lateral display segments are used for each digit;
    display mode selecting means for selecting one of a numerical display mode and a graphical display mode, wherein
    the feature amount and the threshold is presented by the number displayed in the numerical display mode and the feature amount is presented by a graph using longitudinal display segments used to display the number in with two resolutions per digit of the number in the graphical display mode.

5. The sensor device according to claim 4, wherein a number of display digits of the display unit to be commonly used with the graphical presentation is equal to four.

6. The display unit according to claim 5, wherein a display color when displaying a numeral is different from a display color of a graph.

7. A display unit comprising:
    a plurality of display segments arranged in an 8-shape to present a plurality of numerals; and
    a graph displayed using a selected display segment among the plurality of display segments, wherein
    display segments used for presenting the graph have a display color which can be changed,
    a given feature amount or a threshold is presented by the numerical display in one display color when a numeral is displayed, the given feature amount is displayed by the graph using display segments selected from the display segments used for presenting the numerical display, and a part of the display segments selected from the display segments used for presenting the numerical display presents a display color different from a display color of the graph indicating a threshold position in the graph by a position of the part of the display segments.

* * * * *